United States Patent [19]
Boyce

[11] Patent Number: 6,138,779
[45] Date of Patent: Oct. 31, 2000

[54] HARDFACING HAVING COATED CERAMIC PARTICLES OR COATED PARTICLES OF OTHER HARD MATERIALS PLACED ON A ROTARY CONE CUTTER

[75] Inventor: James Edward Boyce, Cedar Hill, Tex.

[73] Assignee: Dresser Industries, Inc., Dallas, Tex.

[21] Appl. No.: 09/008,100

[22] Filed: Jan. 16, 1998

[51] Int. Cl.⁷ .................................................. E21B 10/50
[52] U.S. Cl. ............................ 175/374; 175/425; 51/309
[58] Field of Search ...................................... 175/425, 374, 175/375; 51/295, 309; 428/403, 404, 698, 704

[56] References Cited

U.S. PATENT DOCUMENTS

| | | | |
|---|---|---|---|
| 3,389,761 | 6/1968 | Ott | 175/374 |
| 3,461,983 | 8/1969 | Hudson et al. | 175/375 |
| 3,497,942 | 3/1970 | Weiss | 29/470 |
| 3,575,247 | 4/1971 | Feenstra | 175/329 |
| 3,650,714 | 3/1972 | Farkas | 51/295 |
| 3,757,878 | 9/1973 | Wilder et al. | 175/329 |
| 3,768,984 | 10/1973 | Foster, Jr. | 29/182.8 |
| 3,800,891 | 4/1974 | White et al. | 175/374 |
| 3,841,852 | 10/1974 | Wilder et al. | 51/295 |
| 3,850,590 | 11/1974 | Chalkley et al. | 51/298 |
| 3,871,840 | 3/1975 | Wilder et al. | 51/295 |
| 3,894,673 | 7/1975 | Lowder et al. | 228/122 |
| 3,922,038 | 11/1975 | Scales | 308/8.2 |
| 3,986,842 | 10/1976 | Quaas | 29/191.2 |
| 4,048,705 | 9/1977 | Blampain et al. | 29/420 |
| 4,109,737 | 8/1978 | Bovenkerk | 175/329 |

(List continued on next page.)

FOREIGN PATENT DOCUMENTS 462955  12/1991  European Pat. Off. ........ E21B 10/56

OTHER PUBLICATIONS

Clifford A. Kelto, "Rapid Omnidirectional Compaction," Special and Developing Processes, pp. 542–546 (no date).
Security/Dresser "Security Oilfield Catalog" Rock Bits, Diamond Products, Drilling Tools, *Security Means Technology*, Nov. 1991.
Security/DBS "PSF Premium Steel Tooth Bits with TECH2000 Hardfacing" 5M/4/95–SJ 1995 Dresser Industries, Inc..
Security/DBS "PSF MPSF with Diamond Tech2000 Hardfacing" 1995 Dresser Industries, Inc.
International Search Report, dated Nov. 7, 1996, re International Application PCT/US96/12462.
Security/DBS "tech.comm, The Most Complete Diamond Technology Family" 1997 Security DBS.

*Primary Examiner*—William Neuder
*Assistant Examiner*—Zakiya Walker
*Attorney, Agent, or Firm*—Groover & Associates; Betty Formby; Robert Groover

[57] ABSTRACT

Hardfacing to protect wear surfaces of drill bits and other downhole tools having coated cubic boron nitride particles or coated particles of other ceramic, superabrasive or superhard materials dispersed within and bonded to a matrix deposit. The coating on the ceramic particles or particles of other hard materials may be formed from materials and alloys such as tungsten carbide, and tungsten carbide/cobalt and cermets such as metal carbides and metal nitrides. The coated particles are preferably sintered and have a generally spherical shape. The coated particles are pre-mixed with selected materials such that welding and cooling will form both metallurgical bonds and mechanical bonds within the solidified matrix deposit. A welding rod may be prepared by placing a mixture of selected hard particles such as coated cubic boron nitride particles, hard particles such as tungsten carbide/cobalt, and loose filler material into a steel tube. A substrate may be hardfaced by progressively melting the welding rod onto a selected surface of the substrate and allowing the melted material to solidify and form the desired hardfacing with coated cubic boron nitride particles dispersed within the matrix deposit on the substrate surface.

22 Claims, 5 Drawing Sheets

U.S. PATENT DOCUMENTS

| | | | |
|---|---|---|---|
| 4,117,968 | 10/1978 | Naidich et al. | 228/124 |
| 4,140,189 | 2/1979 | Garner | 173/329 |
| 4,148,368 | 4/1979 | Evans | 175/329 |
| 4,156,329 | 5/1979 | Daniels et al. | 51/295 |
| 4,173,457 | 11/1979 | Smith | 51/309 |
| 4,173,685 | 11/1979 | Weatherly | 428/556 |
| 4,182,394 | 1/1980 | Cason, Jr. | 164/4 |
| 4,228,214 | 10/1980 | Steigelman et al. | 428/212 |
| 4,262,761 | 4/1981 | Crow | 175/374 |
| 4,274,840 | 6/1981 | Housman | 51/307 |
| 4,339,009 | 7/1982 | Busby | 175/374 |
| 4,341,557 | 7/1982 | Lizenby | 75/223 |
| 4,359,335 | 11/1982 | Garner | 75/208 |
| 4,376,793 | 3/1983 | Jackson | 427/34 |
| 4,398,952 | 8/1983 | Drake | 419/18 |
| 4,562,892 | 1/1986 | Ecer | 175/371 |
| 4,592,433 | 6/1986 | Dennis | 175/329 |
| 4,593,776 | 6/1986 | Salesky et al. | 175/375 |
| 4,597,456 | 7/1986 | Ecer | 175/371 |
| 4,604,106 | 8/1986 | Hall et al. | 51/293 |
| 4,630,692 | 12/1986 | Ecer | 175/330 |
| 4,656,002 | 4/1987 | Lizenby et al. | 419/10 |
| 4,666,797 | 5/1987 | Newman et al. | 428/681 |
| 4,679,640 | 7/1987 | Crawford | 175/374 |
| 4,682,987 | 7/1987 | Brady et al. | 51/293 |
| 4,688,651 | 8/1987 | Dysart | 175/371 |
| 4,694,918 | 9/1987 | Hall | 175/329 |
| 4,705,124 | 11/1987 | Abrahamson et al. | 175/410 |
| 4,708,752 | 11/1987 | Kar | 148/127 |
| 4,722,405 | 2/1988 | Langford, Jr. | 175/374 |
| 4,726,432 | 2/1988 | Scott et al. | 175/375 |
| 4,726,718 | 2/1988 | Meskin et al. | 408/145 |
| 4,729,440 | 3/1988 | Hall | 175/107 |
| 4,738,322 | 4/1988 | Hall et al. | 175/329 |
| 4,744,943 | 5/1988 | Timm | 419/10 |
| 4,770,907 | 9/1988 | Kimura | 427/217 |
| 4,781,770 | 11/1988 | Karr | 148/16.5 |
| 4,784,023 | 11/1988 | Dennis | 76/108 |
| 4,802,539 | 2/1989 | Hall et al. | 175/329 |
| 4,814,234 | 3/1989 | Bird | 428/564 |
| 4,836,307 | 6/1989 | Keshavan et al. | 175/374 |
| 4,861,350 | 8/1989 | Phaal et al. | 51/307 |
| 4,874,398 | 10/1989 | Ringwood | 51/293 |
| 4,938,991 | 7/1990 | Bird | 427/190 |
| 4,943,488 | 7/1990 | Sung et al. | 428/552 |
| 4,948,388 | 8/1990 | Ringwood | 51/308 |
| 4,956,012 | 9/1990 | Jacobs et al. | 75/236 |
| 4,976,324 | 12/1990 | Tibbitts | 175/329 |
| 4,985,051 | 1/1991 | Ringwood | 51/309 |
| 4,997,049 | 3/1991 | Tank et al. | 175/410 |
| 5,010,043 | 4/1991 | Ringwood | 501/90 |
| 5,025,874 | 6/1991 | Barr et al. | 175/329 |
| 5,051,112 | 9/1991 | Keshavan et al. | 51/309 |
| 5,074,367 | 12/1991 | Estes | 175/374 |
| 5,106,393 | 4/1992 | Ringwood | 51/308 |
| 5,111,895 | 5/1992 | Griffin | 175/425 |
| 5,131,480 | 7/1992 | Lockstedt et al. | 175/374 |
| 5,143,523 | 9/1992 | Matarrese | 51/293 |
| 5,147,001 | 9/1992 | Chow et al. | 175/428 |
| 5,147,996 | 9/1992 | Carlin | 219/76.14 |
| 5,152,194 | 10/1992 | Keshavan et al. | 76/108 |
| 5,154,245 | 10/1992 | Waldenstrom et al. | 175/420 |
| 5,190,796 | 3/1993 | Iacovangelo | 427/304 |
| 5,199,832 | 4/1993 | Meskin et al. | 408/145 |
| 5,205,684 | 4/1993 | Meskin et al. | 408/145 |
| 5,206,083 | 4/1993 | Raj et al. | 428/323 |
| 5,224,969 | 7/1993 | Chen et al. | 51/295 |
| 5,230,718 | 7/1993 | Oki et al. | 51/293 |
| 5,232,469 | 8/1993 | McEachron et al. | 51/295 |
| 5,236,116 | 8/1993 | Solanski et al. | 228/178 |
| 5,248,006 | 9/1993 | Scott et al. | 175/420 |
| 5,250,086 | 10/1993 | McEachron et al. | 51/309 |
| 5,250,355 | 10/1993 | Newman et al. | 428/367 |
| 5,261,477 | 11/1993 | Brunet et al. | 164/97 |
| 5,273,125 | 12/1993 | Jurewicz | 175/420 |
| 5,279,374 | 1/1994 | Sievers et al. | 175/374 |
| 5,279,375 | 1/1994 | Tibbitts et al. | 175/428 |
| 5,282,512 | 2/1994 | Besson et al. | 175/374 |
| 5,282,513 | 2/1994 | Jones | 175/434 |
| 5,287,936 | 2/1994 | Grimes et al. | 175/331 |
| 5,288,297 | 2/1994 | Ringwood | 51/293 |
| 5,291,807 | 3/1994 | Vanderford et al. | 76/108 |
| 5,303,785 | 4/1994 | Duke | 175/57 |
| 5,308,367 | 5/1994 | Julien | 51/293 |
| 5,328,763 | 7/1994 | Terry | 428/559 |
| 5,335,738 | 8/1994 | Waldenstrom et al. | 175/420 |
| 5,337,844 | 8/1994 | Tibbetts | 175/434 |
| 5,341,890 | 8/1994 | Cawthorne et al. | 175/374 |
| 5,346,026 | 9/1994 | Pessier et al. | 175/331 |
| 5,348,108 | 9/1994 | Scott et al. | 175/432 |
| 5,348,770 | 9/1994 | Sievers et al. | 427/422 |
| 5,351,768 | 10/1994 | Scott et al. | 175/374 |
| 5,351,770 | 10/1994 | Cawthorne et al. | 175/374 |
| 5,351,771 | 10/1994 | Zahradnik | 175/374 |
| 5,351,772 | 10/1994 | Smith | 175/428 |
| 5,353,885 | 10/1994 | Hooper et al. | 175/378 |
| 5,355,750 | 10/1994 | Scott et al. | 76/108 |
| 5,370,195 | 12/1994 | Keshan et al. | 175/420 |
| 5,405,573 | 4/1995 | Clark et al. | 419/35 |
| 5,423,899 | 6/1995 | Krall et al. | 75/231 |
| 5,425,288 | 6/1995 | Evans | 76/108 |
| 5,429,200 | 7/1995 | Blackman et al. | 175/371 |
| 5,452,771 | 9/1995 | Blackman et al. | 175/353 |
| 5,469,927 | 11/1995 | Griffin | 175/432 |
| 5,486,137 | 1/1996 | Flood et al. | 451/540 |
| 5,535,838 | 7/1996 | Keshavan et al. | 175/374 |
| 5,594,931 | 1/1997 | Krall et al. | 419/5 |
| 5,606,895 | 3/1997 | Huffstutler | 76/108.4 |
| 5,609,286 | 3/1997 | Anthon | 228/56.3 |
| 5,633,084 | 5/1997 | Hiraiwa et al. | 428/403 |
| 5,647,449 | 7/1997 | Dennis | 175/434 |
| 5,667,903 | 9/1997 | Boyce | 428/558 |
| 5,755,298 | 5/1998 | Langford et al. | 175/374 |
| 5,755,299 | 5/1998 | Langford et al. | 175/375 |

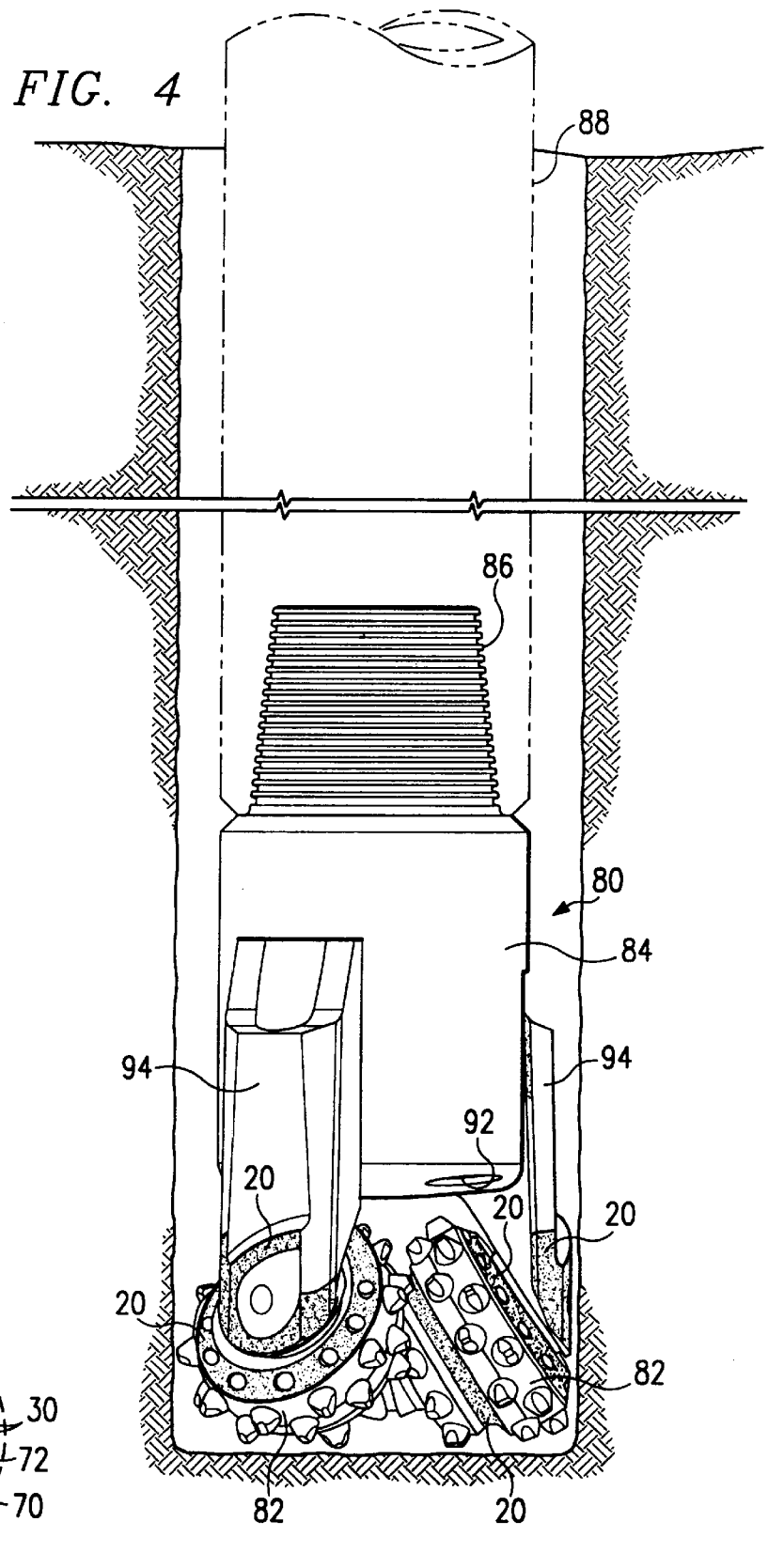

HARDFACING HAVING COATED CERAMIC PARTICLES OR COATED PARTICLES OF OTHER HARD MATERIALS PLACED ON A ROTARY CONE CUTTER This application is related to copending patent applications Ser. No. 09/008,117 filed Jan. 16, 1998 entitled *Inserts and Compacts Having Coated or Encrusted Cubic Boron Nitride Particles*; Ser. No. 09/008,373 filed Jan. 16, 1998 entitled *Inserts and Compacts Having Coated or Encrusted Diamond Particles*; Ser. No. 08/438,999 filed May 10, 1995 entitled *Method of Hard Facing a Substrate and Weld Rod Used in Hard Facing a Substrate*, now U.S. Pat. No. 5,667,903 dated Sep. 16, 1997; Ser. No. 08/579,454 filed Dec. 27, 1995 entitled *Hardfacing with Coated Diamond Particles*, now U.S. Pat. No. 5,755,299 dated May 26, 1998; and Ser. No. 08/818,468 filed Mar. 12, 1997 entitled *Hardfacing with Coated Diamond Particles*, now U.S. Pat. No. 5,755,298 dated May 26, 1998.

TECHNICAL FIELD OF THE INVENTION

The present invention relates in general to forming a layer of hardfacing material having coated or encrusted ceramic particles such as cubic boron nitride particles dispersed within a matrix deposit and, more particularly, to an improved hardfacing having enhanced wear resistance properties when deposited on steel alloy surfaces and other generally metallic substrates.

BACKGROUND OF THE INVENTION

Hardfacing of metal surfaces and substrates is a well known technique to minimize or prevent erosion and abrasion of the metal surface or substrate. Hardfacing can be generally defined as applying a layer of hard, abrasion resistant material to a less resistant surface or substrate by plating, welding, spraying or other well known deposition techniques. Hardfacing is frequently used to extend the service life of drill bits and other downhole tools used in the oil and gas industry. Tungsten carbide and its various alloys are some of the more widely used hardfacing materials to protect drill bits and other downhole tools associated with drilling and producing oil and gas wells.

Hardfacing is typically a mixture of a hard, wear-resistant material embedded in a matrix deposit which is preferably fused with the surface of a substrate by forming metallurgical type bonds to ensure uniform adherence of the hardfacing to the substrate. For some applications, wear-resistant material such as an alloy of tungsten carbide and/or cobalt is placed in a steel tube which serves as a welding rod during welding of the hardfacing with the substrate. This technique of applying hardfacing is sometimes referred to as "tube rod welding." Tungsten carbide/cobalt hardfacing applied with tube rods has been highly successful in extending the service life of drill bits and other downhole tools.

Rotary cone drill bits are often used for drilling boreholes for the exploration and production of oil and gas. This type of bit typically employs three rolling cone cutters, also known as rotary cone cutters, rotatably mounted on spindles extending from support arms of the bit. The cutters are mounted on respective spindles that typically extend downwardly and inwardly with respect to the bit axis so that the conical sides of the cutters tend to roll on the bottom of a borehole and contact the formation.

For some applications, milled teeth are formed on the cutters to cut and gouge in those areas that engage the bottom and peripheral wall of the borehole during the drilling operation. The service life of milled teeth may be improved by the addition of tungsten carbide particles to hard metal deposits on selected wear areas of the milled teeth. This operation is sometimes referred to as "hardfacing." U.S. Pat. No. 4,262,761, issued Apr. 21, 1981 discloses the application of hardfacing to milled teeth and is incorporated by reference for all purposes within this application.

For other applications, sockets may be formed in the exterior of the cutters and hard metal inserts placed in the sockets to cut and gouge in those areas that engage the bottom and peripheral wall of the borehole during the drilling operation. The service life of such inserts and cutters may be improved by carburizing the exterior surface of the cutters. U.S. Pat. No. 4,679,640 issued on Jul. 14, 1987 discloses one procedure for carburizing cutters and is incorporated by reference for all purposes within this application.

A wide variety of hardfacing materials have been satisfactorily used on drill bits and other downhole tools. A frequently used hardfacing includes sintered tungsten carbide particles in an alloy steel matrix deposit. Other forms of tungsten carbide particles may include grains of mono-tungsten carbide, ditungsten carbide and/or macrocrystalline tungsten carbide. Satisfactory binders may include materials such as cobalt, iron, nickel, alloys of iron and other metallic alloys. For some applications loose hardfacing material is generally placed in a hollow tube or welding rod and applied to the substrate using conventional welding techniques. As a result of the welding process, a matrix deposit including both steel alloy melted from the substrate surface and steel alloy provided by the welding rod or hollow tube is formed with the hardfacing. Various alloys of cobalt, nickel and/or steel may be used as part of the binder for the matrix deposit. Other heavy metal carbides and nitrides, in addition to tungsten carbide, have been used to form hardfacing.

Both natural and synthetic diamonds have been used in downhole drill bits to provide cutting surfaces and wear-resistant surfaces. U.S. Pat. No. 4,140,189 teaches the use of diamond inserts protruding from the shirttail surface of a roller cone bit. Polycrystalline diamond (PCD) gauge inserts are frequently used on a wide variety of drill bits to prevent erosion and wear associated with harsh downhole drilling conditions. U.S. Pat. No. 4,140,189 is incorporated by reference for all purposes within this application.

SUMMARY OF THE INVENTION

Accordingly, a need has arisen in the art for an improved hardfacing material. The present invention provides a hardfacing material that substantially eliminates or reduces problems associated with prior hardfacing materials.

In accordance with the present invention, a hardfacing material may comprise coated ceramic particles and/or other coated particles of superabrasive and superhard materials which may be metallurgically bonded with a deposit matrix to form the desired hardfacing. The coated particles are also mechanically held in place and protected by the surrounding matrix deposit which is preferably also formed from hard materials. Ceramic particles and other superabrasive or superhard particles satisfactory for use with the present invention may be commonly found as phases in the boron-carbon-nitrogen-silicon family of alloys and compounds. Examples of hard particles satisfactory for use with the present invention include silicon nitride ($Si_3N_4$), silicon carbide (SiC), boron carbide ($B_4C$) and cubic boron nitride (CBN). The coated particles are preferably dispersed within and both metallurgically and mechanically bonded with a deposit matrix formed from hard materials which are wear resistant. Cooperation between the wear resistance deposit matrix and the coated particles provides an enhanced hardfacing to better withstand abrasion, wear, erosion, and other stresses.

One aspect of the present invention includes providing hardfacing with coated ceramic particles and other types of coated particles formed in part from superabrasive and superhard materials with the coated particles dispersed throughout the hardfacing. Another aspect of the present invention includes providing a drill bit with layers of hardfacing having coated or encrusted cubic boron nitride particles disposed therein. The resulting hardfacing is able to better withstand abrasion, wear, erosion and other stresses associated with repeated use in a harsh, downhole drilling environment.

Technical advantages of the present invention include providing a layer of hardfacing material on selected portions of a drill bit to prevent undesired wear, abrasion and/or erosion of the protected portions of the drill bit. For one application, a layer of hardfacing having coated or encrusted cubic boron nitride particles may be deposited on selected exterior surfaces of milled teeth to prevent premature wear of the milled teeth during downhole drilling and to substantially extend the life of the associated drill bit.

Further aspects of the present invention include mixing coated or encrusted cubic boron nitride particles with conventional tube rod compositions to provide an enhanced hardfacing surface on a substrate. For one embodiment of the present invention, each milled tooth on a rotary cone drill bit is completely covered with a layer of hardfacing material which includes coated or encrusted cubic boron nitride particles in accordance with the teachings of the present invention. The coated or encrusted cubic boron nitride particles are preferably sintered prior to mixing with the other materials which will be used to form the layer of hardfacing on the substrate.

Technical advantages of the present invention include coating or encrusting ceramic particles such as cubic boron nitride particles or hard particles formed from other superabrasive and superhard materials and sintering the coating to form chemical or metallurgical bonds between the coating and the surface of the associate ceramic particle or other hard particle. Varying the composition of the coating and/or sintering the coating can also be used to vary the density of the resulting coated particles to be equal to or greater than the density of the hard materials used to form the associated matrix deposit when the matrix deposit is in its molten state prior to solidification. The coating on the hard particles can also be reinforced with small grains of boride, carbide, oxide and/or nitride which cooperate with other components of the matrix deposit to improve retention of the coated particles within the matrix deposit during erosion, abrasion and/or wear of the associated hardfacing.

The hard materials which will form the resulting matrix deposit and coated particles disposed therein are preferably applied to a substrate by hardfacing techniques which form chemical or metallurgical bonds between the surface of the substrate and the resulting matrix deposit, and between the matrix deposit and the coating on each particle. Both the matrix deposit and the coating can be formed from a wide variety of metallic and ceramic compounds in accordance with teachings of the present invention.

Further technical advantages of the present invention include coating or encrusting cubic boron nitride particles which will protect the associated cubic boron nitride particles from decomposition through exposure to high temperatures associated with various hardfacing techniques.

For some applications, each cubic boron nitride particle is preferably encrusted with a coating having a thickness which is roughly equal to one half the diameter of the respective cubic boron nitride particle. As a result of the teachings of the present invention, the extreme hardness of cubic boron nitride particles and other ceramic particles or particles of superabrasive and superhard materials can be integrated into a slightly less hard but much tougher matrix deposit formed from materials such as tungsten carbide. The abrasion, erosion and wear resistance of the hard particles is augmented by the hard materials selected to form the respective coating for each hard particle. For example, when the hard materials selected to form the coating include cobalt, the tougher cementing phase of metallic cobalt will substantially improve the abrasion, erosion and wear resistance associated with cubic boron nitride particles.

Other technical advantages will be readily apparent to one skilled in the art from the following figures, descriptions and claims.

BRIEF DESCRIPTION OF THE DRAWINGS

For a more complete understanding of the present invention and its advantages thereof, reference is now made to the following brief description, taken in conjunction with the accompanying drawings and detailed description, wherein like reference numerals represent like parts, in which:

FIGS. 3A and 3B are schematic drawings in elevation and in section with portions broken away showing a hollow welding rod with a filler having coated hard particles such as coated cubic boron nitride particles and other hard materials disposed therein in accordance with teachings of the present invention;

FIG. 4 is a schematic drawing in section and in elevation showing a drill bit with hardfacing formed in accordance with the teachings of the present invention at a downhole location in a wellbore;

DETAILED DESCRIPTION OF THE INVENTION

Figure 1:
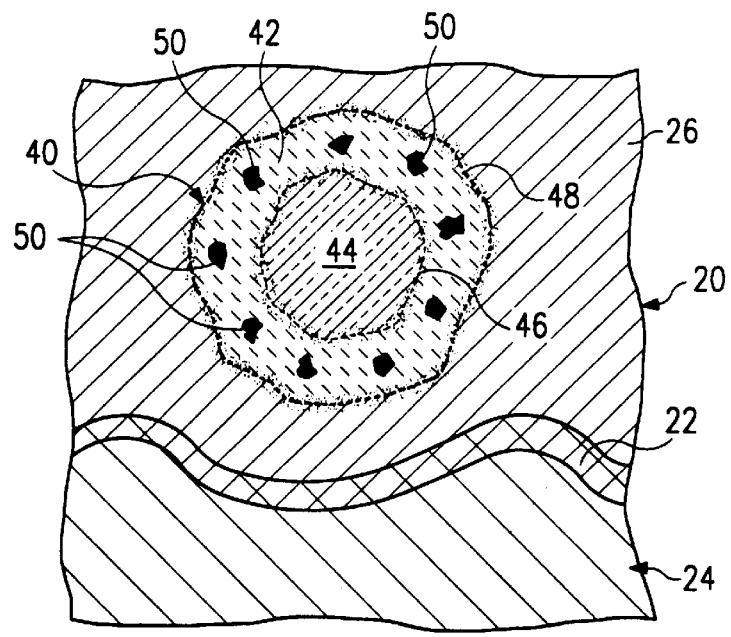
FIG. 1 is an enlarged schematic drawing in section with portions broken away showing a coated hard particle such as a coated cubic boron nitride particle dispersed within and bonded to a matrix deposit in accordance with teachings of the present invention.

The preferred embodiments of the present invention and its advantages are best understood by referring now in more detail to FIGS. 1–10 of the drawings, in which like numerals refer to like parts.

Since machining wear resistant material is both difficult and expensive, it is common practice to form a metal part with a desired configuration and subsequently treat the surface by directly hardening the metal part (carburizing and/or nitriding) or by applying a layer of wear resistant material (hardfacing) to the surface depending upon the amount of wear resistance desired. For applications when resistance to extreme wear of a working surface of a metal part or substrate is required, hardfacing such as matrix deposit 20 having a layer of hard, wear resistant material formed in accordance with the present invention may be applied to working surface 22 to protect the underlying substrate 24.

For purposes of the present application, the term "matrix deposit" is used to refer to a layer of hardfacing which has been applied to a substrate to protect the substrate from abrasion, erosion and/or wear. Various binders such as cobalt, nickel, copper, iron and alloys thereof may be used to form the matrix or binder portion of the deposit. Various metal alloys, ceramic alloys and cermets such as metal borides, metal carbides, metal oxides and metal nitrides may be included as part of the matrix deposit in accordance with the teachings of the present invention. Some of the more beneficial metal alloys, ceramic alloys and cermets will be discussed later in more detail.

For purposes of the present application, the terms "chemical bond" and "metallurgical bond" are used to refer to strong attractive forces that hold together atoms and/or molecules in a crystalline or metallic type structure.

For purposes of the present application, the term "coating" and "coated" are used to refer to a layer of hard material which has been metallurgically bonded to the exterior of a ceramic particle such as cubic boron nitride particle or a particle formed from other superabrasive or superhard materials. The term "encrusted" may also be used to refer to this same layer of hard material. The coating is preferably formed from sinterable materials including various metal alloys, ceramic alloys and cermets such as metal borides, metal carbides, metal oxides and metal nitrides. Some of the more beneficial metal alloys, ceramic alloys and cermets which may be used to form a coating on hard particles such as cubic boron nitride particles in accordance with the teachings of the present invention will be discussed later in more detail.

For purposes of the present application, the terms "coated particles" and "coated hard particles" are used to refer to ceramic particles, particles of superabrasive materials and particles of superhard materials that have a coating formed on each particle in accordance with the teachings of the present invention. For some applications, each hard particle will preferably be encrusted with a coating having a thickness equal to roughly one half the diameter of the respective hard particle. As a result, the nominal diameter of the resulting coated hard particles will be roughly twice the nominal diameter of the respective hard particle. This relatively thick coating or encrustation allows formation of strong chemical or metallurgical bonds between each layer of coating or encrustation and the respective hard particles.

For purposes of the present application, the term "tungsten carbide" includes monotungsten carbide (WC), ditungsten carbide ($W_2C$), macrocrystalline tungsten carbide and cemented or sintered tungsten carbide. Sintered tungsten carbide is typically made from a mixture of tungsten carbide and cobalt powders by pressing the powder mixture to form a green compact. Various cobalt alloy powders may also be included. The green compact is then sintered at temperatures near the melting point of cobalt to form dense sintered tungsten carbide.

For purposes of the present application, the term cubic boron nitride (CBN) refers to an internal crystal structure of boron atoms and nitrogen atoms in which the equivalent lattice points are at the corner of each cell. Boron nitride particles typically have a diameter of approximately one micron and appear as a white powder. Boron nitride, when initially formed, has a generally graphite-like, hexagonal plate structure. When compressed at high pressures (such as $10^6$ PSI) cubic boron nitride particles will be formed with a hardness very similar to diamonds. However, the mechanical strength of cubic boron nitride is generally low in comparison with many steel alloys.

Figure 5:
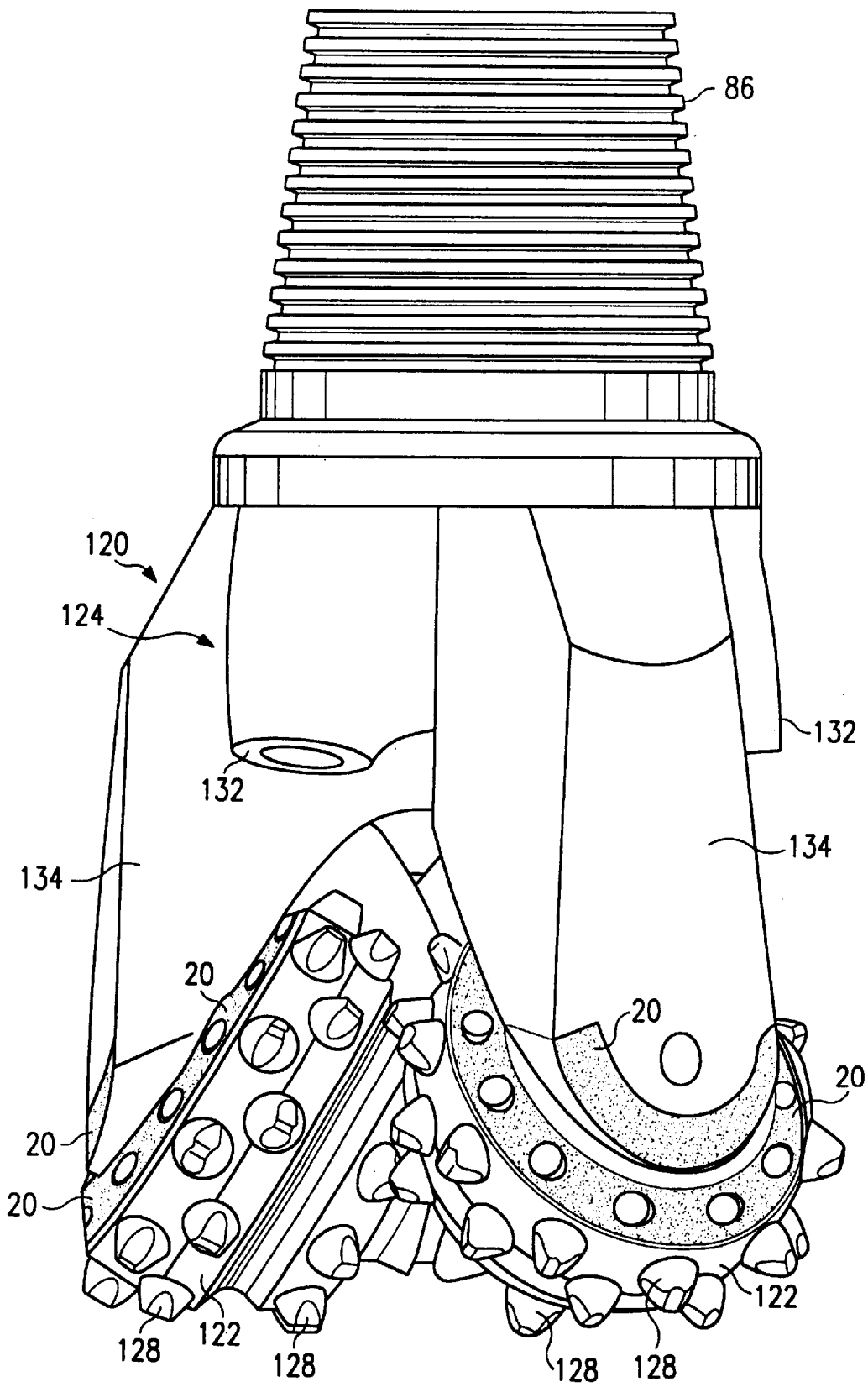
FIG. 5 is a schematic drawing in elevation showing another type of drill bit with hardfacing formed in accordance with teachings of the present invention.
Figure 8:
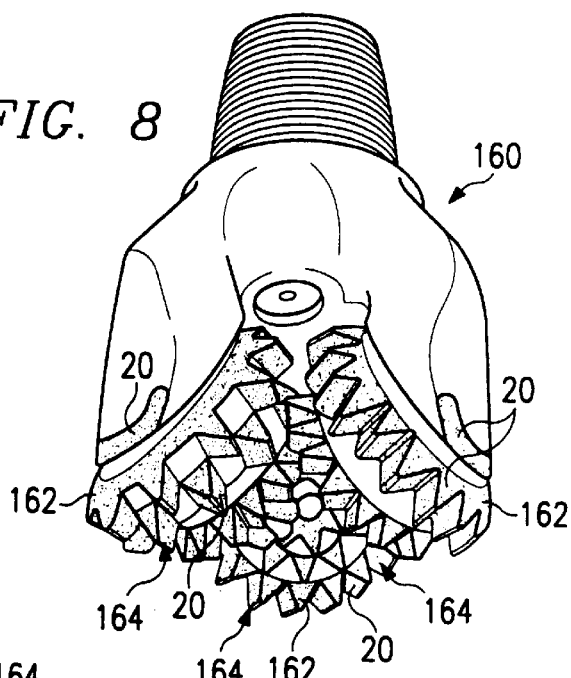
FIG. 8 is a schematic drawing showing an isometric view of a rotary cone drill bit having milled teeth with layers of hardfacing formed in accordance with teachings of the present invention.

Substrate 24 may be formed from a wide variety of metal alloys and cermets having desirable metallurgical characteristics such as machinability, toughness, heat treatability, and corrosion resistance. For example, substrate 24 may be formed from various steel alloys associated with the manufacture of rotary drill bits 80, 120 and 160 as shown in FIGS. 4, 5 and 8. For purposes of illustration, substrate 24 and hardfacing or matrix deposit 20 will be described with respect to various types of downhole drill bits. However, hardfacing 20 incorporating teachings of the present invention may be formed on any surface of a wide variety of tools such as saws, chisels, plows, fluid flow control equipment or other articles of manufacture which require protection from abrasion, erosion and/or wear. Substrate 24 is intended to be representative of any surface on any tool or machine that would benefit from having hardfacing 20 disposed thereon in accordance with teachings of the present invention.

As discussed later in more detail, matrix deposit or hardfacing 20 may include a wide variety of hard materials, hard particles, and coated hard particles or pellets 40. The hard materials and/or hard particles used to form matrix deposit 20 may be selected from a wide variety of metals, metal alloys, ceramic alloys, and cermets which will provide a wear resistant layer of material even without the addition of coated hard particles 40. As a result of the present invention which includes the use of coated hard particles 40, matrix deposit 20 will have significantly enhanced abrasion, erosion and wear resistance as compared to prior hardfacing materials.

Figure 2:
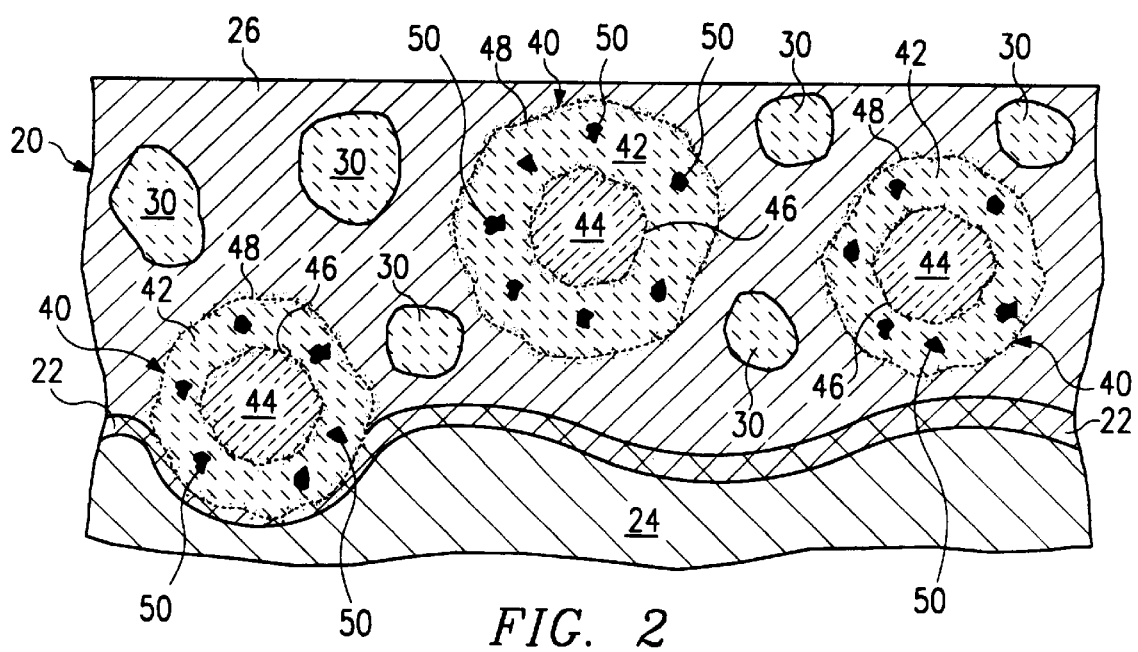
FIG. 2 is a schematic drawing in section with portions broken away showing a coated hard particle such as a coated cubic boron nitride particle dispersed within and bonded to a matrix deposit to form hardfacing on a substrate in accordance with teachings of the present invention.

Matrix deposit 20 as shown in FIGS. 1 and 2 may include a plurality of carbide particles 30 and coated hard particles 40 embedded or encapsulated in matrix portion 26. For purposes of illustration, coated hard particles 40 will be described with respect to having cubic boron nitride particles 44 with coating 42 metallurgically bonded with the exterior of each respective cubic boron nitride particle. However, hardfacing or matrix deposit 20 may be satisfactorily formed in accordance with teachings of the present invention using hard ceramic particles and/or hard particles formed from superabrasive and superhard materials commonly found as phases in the boron-carbon-nitrogen-silicon family of compounds and alloys. Examples of materials that may be satisfactorily used to provide hard particles for coating in accordance with teachings of the present invention include silicon nitride ($Si_3N_4$), silicon carbide (SiC), boron carbide ($B_4C$) in addition to cubic boron nitride (CBN).

Various materials including cobalt, copper, nickel, iron, and alloys of these elements may be used to form matrix portion 26. For example, metal borides, metal carbides, metal oxides and metal nitrides or other superhard and superabrasive materials may be used to form matrix portion 26. From time to time matrix portion 26 may also be referred to as binder portion 26.

Depending upon the intended application for matrix deposit 20, various types of tungsten carbide may be used to form all or a portion of coating 42 on cubic boron nitride particles 44, tungsten carbide particles 30 and/or matrix portion 26 of matrix deposit 20. An important feature of the present invention includes the ability to select the type of hard material which will form each portion of matrix deposit 20 including binder portion 26, hard particles 30 and 44 and coating 42 to provide the desired abrasion, wear, and erosion resistance in an efficient, cost-effective, reliable manner.

Each coated hard particle 40 includes coating 42, which has been metallurgically bonded to exterior 46 of the respective cubic boron nitride particle 44. Preferably, exterior surface 46 of each cubic boron nitride particle 44 will be completely encrusted by coating 42. For some operating environments matrix deposit 20 may perform satisfactorily with less than one hundred percent (100%) coating on each cubic boron nitride particle 44. Coated hard particles 40 may sometimes be referred to as coated pellets. For some applications, cubic boron nitride particles 44 are selected with a range of sixty to eighty U.S. Mesh.

Depending upon the intended application for matrix deposit or hardfacing 20, each hard particle such as cubic boron nitride particle 44 may be selected within the same mesh range prior to coating. For other applications, hard particles 40 may be formed from hard particles such as cubic boron nitride particles 44 selected from two or more different mesh ranges. The resulting coated hard particles 40 will preferably have approximately the same exterior dimensions. However, by including cubic boron nitride particles 44 or other hard particles with different mesh ranges, the wear, erosion and abrasion resistance of the resulting deposit matrix 20 may be modified to accommodate the specific operating environment associated with substrate 24.

Cubic boron nitride particles 44 may be coated using various techniques such as those described in U.S. Pat. No. 4,770,907 entitled "Method for Forming Metal-Coated Abrasive Grain Granules" and U.S. Pat. No. 5,405,573 entitled "Diamond Pellets and Saw Blade Segments Made Therewith." These coating techniques may be modified as appropriate for cubic boron nitride particles. Both of these patents are incorporated by reference for all purposes within this application.

The hard material used to form coating 42 and the thickness of coating 42 may be varied depending upon the intended application for matrix deposit 20. Coating 42 is preferably formed from material which can be sintered to provide a relatively dense layer which fully encapsulates the respective cubic boron nitride particle 44. If coating 42 is not applied, cubic boron nitride particles 44 may be damaged by the temperatures required by many hardfacing techniques to bond binder portion 26 with surface 22 of substrate 24. Encapsulating or coating cubic boron nitride particles 44 with coating 42 protects the respective cubic boron nitride particle 44 from any heat associated with the selected hardfacing procedure. Also, without coating 42, cubic boron nitride particles 44 may have a tendency to float to the surface of any molten materials used to form binder portion 26.

Coating 42 is preferably sintered after being placed on the respective cubic boron nitride particle 44. The sintering process is used to form coated hard particles 40 having a density which is equal to or greater than the density of matrix portion 26 in its molten state. Varying the composition of coating 42 can also be used to vary the density of the resulting coated hard particles 40. Thus, coated hard particles 40 may be uniformly dispersed within matrix deposit 20 or may sink to the bottom and contact surface 22 of substrate 24 depending upon the density established by the sintering process. Without coating 42, cubic boron nitride particles 44 and many other ceramic particles and other particles formed from superabrasive and superhard materials will tend to float to the top when binder portion 26 is in its molten state. Forming coating 42 in accordance with teachings of the present invention, facilitates the desired distribution of coated hard particles 40 throughout binder portion 26. A more uniform distribution of coated hard particles 40 with binder portion 26 improves both the mechanical bonds and metallurgical bonds which secure the associated hard particle such as cubic boron nitride particles 44 within hardfacing or matrix deposit 20.

The materials used to form coating 42 are selected to be metallurgically and chemically compatible with the material used to form both binder portion 26 and the associated hard particle. For many applications, the same material or materials used to form coating 42 will also be used to form binder portion 26. For other applications coating 42 can also be reinforced with small grains 50 formed from boride, carbide, oxide, and/or nitride materials.

Metallurgical bonds are preferably formed between exterior 48 of each coating 42 and binder portion 26. As a result of the metallurgical or chemical bonds coated hard particles 40 remain fixed within matrix deposit 20 until the adjacent hard materials represented by binder portion 26 have been worn away. Coated hard particles 40 provide a higher level of abrasion, erosion and wear resistance for the associated substrate 24 as compared with hardfacing formed from only binder portion 26 or binder portion 26 and hard particles 30. As binder portion 26 undergoes wear around each coated hard particles the respective hard particles such as cubic boron nitride particles 44 will be exposed. The inherently high abrasion, erosion and wear resistance of the newly exposed ceramic particle or other particle formed from superabrasive or superhard materials will increase the overall abrasion, erosion and wear resistance of hardfacing 20 when the respective hard particle such as cubic boron nitride particles 44 are exposed. As the surrounding binder portion 26 continues to be worn away, the ceramic particles or particles formed from other superabrasive or superhard materials may be dislodged from hardfacing 20. Other coated hard particles 40 will then be exposed to provide continued protection and increased useful life for substrate 24.

Matrix deposit 20 may be formed on and bonded to working surface 22 of substrate 24 using various techniques associated with conventional tungsten carbide hardfacing. As a result of the present invention, coated hard particles 40 may be incorporated into a wide variety of hardfacing materials without requiring any special techniques or application procedures.

For many applications, matrix deposit 20 is preferably applied by welding techniques associated with conventional hardfacing. During the welding process, surface 22 of substrate 24 is sufficiently heated to melt portions of substrate 24 and form metallurgical bonds between matrix portion 26 and substrate 24. In FIGS. 1 and 2 surface 22 is shown with a varying configuration and width to represent the results of the welding process and resulting metallurgical bond. During the welding process, portions of coating 42 on one or more cubic boron nitride particles 44 may also be metallurgically bonded with substrate 24 at surface 22.

Tube rod welding with an oxyacetylene torch (not shown) may be satisfactorily used to form metallurgical bonds between matrix deposit 20 and substrate 24 and metallurgical bonds between matrix portion 26 and coating 42. For other applications, laser welding techniques may be used to form matrix deposit 20 on substrate 24. Both tube rod welding techniques and laser welding techniques will be described later in more detail.

For some less stringent applications, matrix deposit 20 may be formed on substrate 24 using plasma spray techniques and/or flame spray techniques, which are both associated with tungsten carbide and other types of hardfacing. Plasma spray techniques typically form a mechanical bond between the resulting hardfacing and the associated substrate. Flame spraying techniques also typically form a mechanical bond between the hardfacing and the substrate. For some applications, a combination of flame spraying and plasma spraying techniques may also be used to form a metallurgical bond between matrix deposit 20 and substrate 24. In general, hardfacing techniques which produce a metallurgical bond are preferred over those hardfacing techniques which provide only a mechanical bond between matrix deposit 20 and substrate 24.

For still other applications coated hard particles 40 may be glued or attached to surface 22 of substrate 24 using water-glassed techniques. Bulk tungsten carbide particles are frequently deposited on selected surfaces of rotary cone drill bits using this same technique. Various types of hardfacing materials in powder form may then be applied over the coated hard particles 40 to provide matrix portion 26 of matrix deposit 20. By sintering coated hard particles 40 and/or varying the material composition of coating 42 to have the desired density, matrix deposit 20 may be formed by any of the techniques suitable for applying hardfacing to substrate 24 and coated hard particles 40 will be dispersed throughout the resulting matrix deposit 20.

For some applications coated hard particles 40 may be distributed within matrix deposit 20 in a range of about twenty-five percent to about seventy-five percent by volume of the materials used to form matrix deposit 20. For other applications, a more preferable range may be approximately forty percent to about fifty percent coated hard particles 40. For some special applications, coated hard particles 40 provide more than seventy-five percent by volume of the materials within matrix deposit 20.

Coated hard particles 40 provide a very high level of wear and abrasion resistance for the underlying substrate 24. As the surrounding matrix portion 26 undergoes wear and abrasion, both tungsten carbide particles 30 and coated hard particles 40 will be exposed. The inherently high wear resistance of the newly exposed coated hard particles 40 and/or tungsten carbide particles 30 significantly increases the overall wear and abrasion resistance of matrix deposit 20.

Many ceramic particles and other particles formed from superabrasive or superhard materials do not easily "wet" or form metallurgical bonds with binder portion 26. Therefore, retention of such hard particles within binder portion 26 is often very difficult. Without coating 42, only relatively weak mechanical bonds may be formed between binder portion 26 and the desired hard particle for inclusion within matrix deposit 20. Preferably, coated hard particles 40 are both metallurgically bonded and mechanically bonded within binder portion 26.

Some crystalline structures associated with ceramic particles and particles formed from other superabrasive and superhard materials such as cubic boron nitride particles 44 may be sensitive to thermal degradation. Applying coating 42 to such hard particles in accordance with teachings of the present invention protects the respective hard particle from conversion to a different crystal structure during the process of depositing hardfacing 20 on substrate 24. For example, without coating 42, when exposed to temperatures associated with tungsten carbide hardfacing, cubic boron nitride particles 44 will tend to convert from the desired cubic crystal structure to the undesired, soft hexagonal crystal structure.

The ratio of coated hard particles 40 with respect to tungsten carbide particles 30 intermixed within matrix deposit 20 may be varied to provide the desired amount of abrasion and wear resistance for substrate 24 depending upon the anticipated operating environment. For some extremely harsh environments, the ratio of coated hard particles 40 to tungsten carbide particles 30 may be 10:1. For other operating environments, the ratio may be substantially reversed. An important benefit of the present invention includes the ability to vary the amount of coated hard particles 40 depending upon the anticipated operating environment. For example forming coated hard particle 40 with cubic boron nitride particle 44 and coating 42 of tungsten carbide will result in matrix deposit 20 having materials of higher hardness (CBN 4500 Hardness Knoop vs 6% WC-Co 1700 Hardness Knoop) and better wear resistance. Hardness Knoop may also be referred to as "HK."

Welding rod 70 formed in accordance with the teachings of the present invention for hardfacing surface 22 to protect substrate 24 from abrasion and wear is shown in FIGS. 3A and 3B. Welding rod 70 preferably includes hollow steel tube 72 which is closed at both ends to contain filler 74 therein. A plurality of coated hard particles 40 are disposed within steel tube 72 as part of filler 74. Each coated cubic boron nitride particle 40 may include cubic boron nitride particle 44 with coating 42 bonded therewith. A plurality of tungsten carbide particles 30 may also be mixed with coated hard particles 40 and dispersed within filler 74. For some applications, filler 74 may include a deoxidizer and a temporary resin binder. Examples of deoxidizers satisfactory for use with the present invention include various alloys of iron, manganese, and silicon.

For some applications, the weight of welding rod 70 will comprise between fifty-five and eighty percent filler 74 and twenty to thirty percent steel tube 72. Filler 74 within steel tube 72 preferably includes a plurality of coated hard particles 40 and tungsten carbide particles 30. For some applications, up to five percent of filler 74 may include deoxidizers and temporary resin binders.

Loose material such as powders of hard material selected from the group consisting of tungsten, niobium, vanadium, molybdenum, silicon, titanium, tantalum, zirconium, chromium, yttrium, boron, carbon and carbides, nitrides, oxides or suicides of these materials may be included as part of filler 74. The loose material may include a powdered mixture selected from the group consisting of copper, nickel, iron, cobalt and alloys of these elements to form matrix portion 26 of matrix deposit 20. Powders of materials selected from the group consisting of metal borides, metal carbides, metal oxides, metal nitrides and other superhard or superabrasive alloys may be included within filler 74. The specific compounds and elements selected for filler 74 will depend upon the intended application for the resulting matrix deposit 20 and the selected welding technique.

For some applications, a mixture of coated hard particles 40, tungsten carbide particles 30 and the selected material for matrix portion 26 may be blended with an organic resin and sprayed on surface 22 of substrate 24. A laser may then be used to densify and fuse the resulting powdered mixture with surface 22 of substrate 24 to form the desired metallurgical bonds as previously discussed. By sintering coating 42 and/or varying the composition of coating 42 to provide the desired density, coated hard particles 40 will remain dispersed throughout matrix deposit 20. U.S. Pat. No. 4,781,770 entitled "Process For Laser Hardfacing Drill Bit Cones Having Hard Cutter Inserts" shows one process satisfactory for use with the present invention. U.S. Pat. No. 4,781,770 is incorporated by reference for all purposes within this application.

Depending upon the type of hard material used to form coating 42, various types of sintering processes and procedures may be satisfactorily used to establish the desired density of the resulting coated hard particles 40. Also, the ratio of the materials used to form coating 42 may be varied to provide the desired density. For example, when coating 42 is formed from tungsten carbide, the percentage of tungsten may be increased to provide a denser or heavier coating 42. Alternatively, the percentage of carbide may be decreased to provide a lighter or less dense coating 42. For other applications, small grains 50 formed from the desired boride, carbide, oxide and/or nitride materials can also be added to reduce the density of coating 42 and to improve the resulting wear, erosion and/or abrasion resistance.

When coated hard particles 40 are mixed with tungsten carbide particles 30, preferably both particles 40 and 30 will have approximately the same density. One of the technical benefits of the present invention includes the ability to vary the density and the materials associated with coating 42 to ensure compatibility with tungsten carbide particles 30 and/or binder portion 26 of matrix deposit 20. For some applications, coated hard particles 40 may be sintered using hot isostatic pressing techniques at temperatures of approximately 1300° F. Naturally, the type of sintering, including both pressure and temperature, may be varied depending upon the materials selected to form the respective hard particle coating 42 and binder portion 26.

Coating 42 may be applied to each hard particle using various techniques such as pelletizing, chemical vapor deposition, physical vapor deposition, and/or chemical coating. The coating procedure may be selected based on the materials used to form the respective hard particles and coating 42 to ensure that metallurgical bonds are preferably formed between the exterior surface of each hard particle and the resulting coating 42.

In addition to welding rod 70, coated hard particles 40, tungsten carbide particles 30, and the selected materials for matrix portion 26 may be included as part of a continuous welding rod, composite welding rod, or welding rope (not shown). In addition to oxyacetylene welding, atomic hydrogen welding techniques, tungsten inert gas (TIG-GTA), stick welding or SMAW and GMAW welding techniques may be satisfactorily used to apply matrix deposit 20 to surface 22 of substrate 24.

Hardfacing such as matrix deposit 20 formed in accordance with the teachings of the present invention may be used on a wide variety of steel bodies and substrates. For example, hardfacing 20 may be placed on roller cone drill bits, fixed cutter drill bits, sleeve for drill bits, coring bits, underreamers, hole openers, stabilizers and shock absorber assemblies. Hardfacing 20 formed in accordance with the teachings of the present invention may be used on other tools in a wide variety of industries and is not limited to downhole tools for the oil and gas industry. For purposes of explanation only, layers of hardfacing 20 formed in accordance with the teachings of the present invention are shown in FIGS. 4–10 on various types of rotary cone drill bits and their associated cutter cone assemblies.

The cutting action or drilling action of drill bit 80, 120 and 160 occurs as respective cutter cone assemblies 82, 122 and 162 are rolled around the bottom of the borehole by the rotation of an associated drill string. Cutter cone assemblies 82, 122 and 162 may sometimes be referred to as "rotary cone cutters" or "roller cone cutters." The inside diameter of the resulting borehole is generally established by the combined outside diameter, or gage diameter, of cutter cone assemblies 82, 122 and 162. Cutter cone assemblies 82, 122 and 162 may be retained on a spindle by a conventional ball retaining system comprising a plurality of ball bearings aligned in a ball race.

Rotary cone drill bits 80, 120 and 160 are typically manufactured from a strong, ductile steel alloy, selected to have good strength, toughness and reasonable machinability. Such steel alloys generally do not provide good, long term cutting surfaces and cutting faces on the respective cutter cone assemblies 82, 122 and 162 because such steel alloys are often rapidly worn away during downhole drilling operations. To increase the downhole service life of the respective rotary cone drill bits 80, 120 and 160, deposit matrix or hardfacing 20 may be placed on shirttail surfaces, backface surfaces, milled teeth, and/or inserts associated with these respective drill bits. Matrix deposit 20 may also be placed on any other portions of drill bits 80, 120 and 160 which are subjected to intense erosion, wear and abrasion during downhole drilling operations. For some applications, essentially all of the exterior surface of each cutter cone 82, 122 and 162 may be covered with matrix deposit 20.

Drill bit 80 includes a bit body 84 adapted to be connected at its pin or threaded connection 86 to the lower end of rotary drill string 88. Threaded connection 86 and the corresponding threaded connection of the drill string are designed to allow rotation of drill bit 80 in response to rotation of the drill string 88 at the well surface (not shown). Bit body 84 includes a passage (not shown) that provides downward communication for drilling mud or the like passing downwardly through the drill string. The drilling mud exits through nozzle 92 and is directed to the bottom of the borehole and then passes upward in the annulus between the wall of the borehole and the drill string, carrying cuttings and drilling debris therewith.

Depending from bit body 84 are three substantially identical arms 94. Only two arms 94 are shown in FIG. 4. The lower end portion of each of the arms 94 is provided with a bearing pin or spindle (not shown), to rotatably support generally conical cutter cone assembly 82.

Drill bit 120 as shown in FIG. 5 includes bit body 124 formed by support arms 134. Bit body 124 also includes nozzles 132. Threaded connection 86 may be used to attach drill bit 120 to a rotary drill string.

Figure 6:
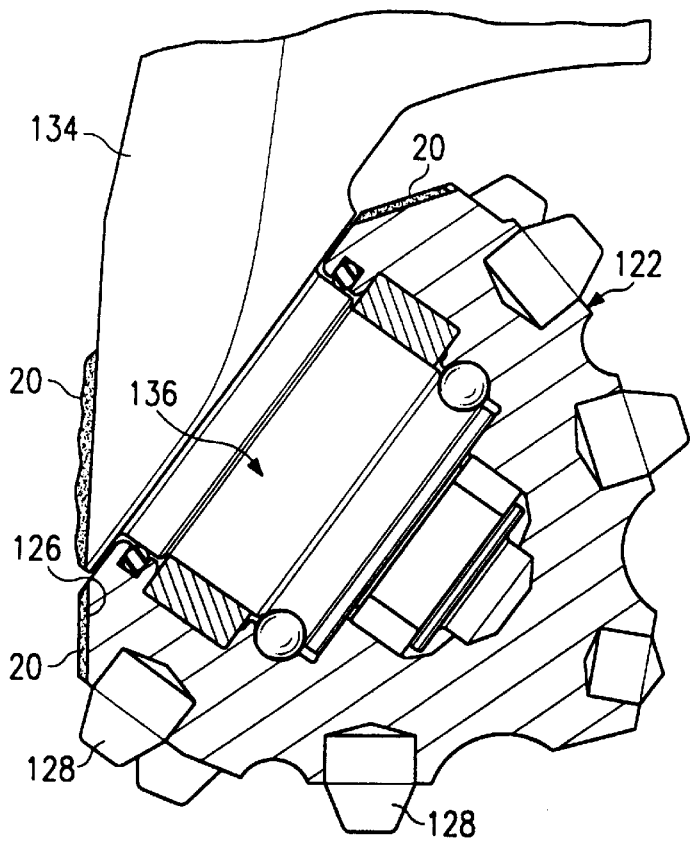
FIG. 6 is a drawing partially in section and partially in elevation with portions broken away showing a cutter cone assembly and support arm of the rotary cone bit of FIG. 5 having layers of hardfacing formed in accordance with teachings of the present invention.
Figure 7:
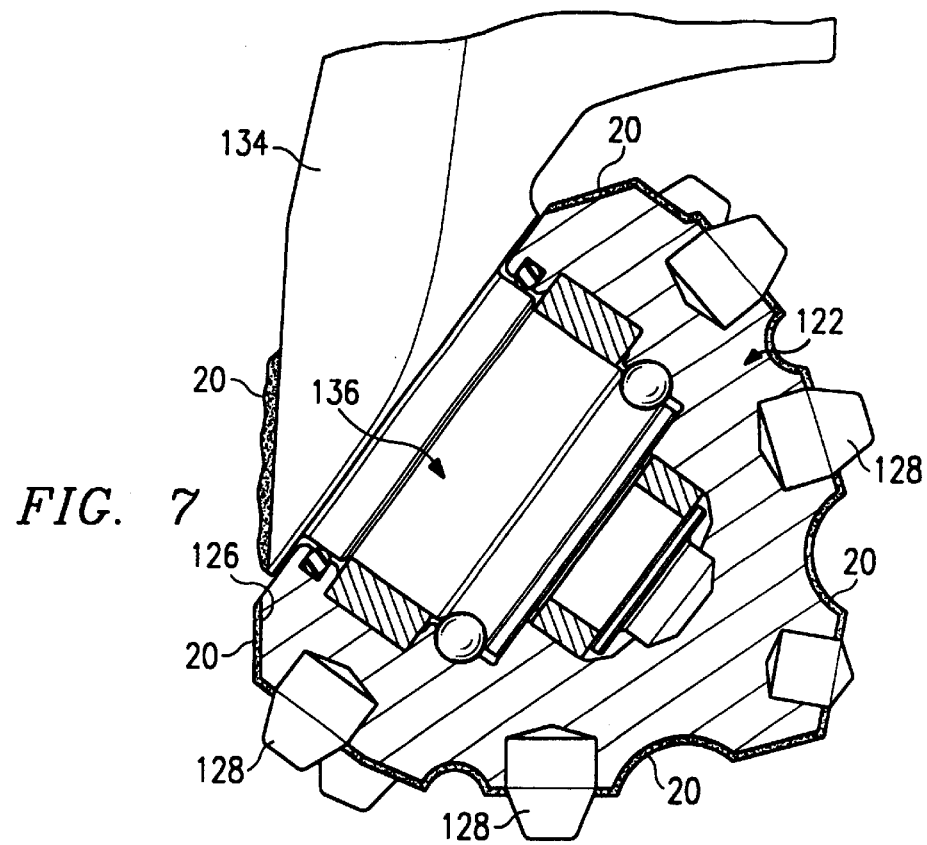
FIG. 7 is a drawing partially in section and partially in elevation with portions broken away showing the cutter cone assembly and support arm of FIG. 6 with additional layers of hardfacing formed in accordance with the teachings of the present invention.

FIGS. 6 and 7 show cutter cone assemblies 122 which have been rotatably mounted on spindle 136 extending from the lower portion of each support arm 134.

As shown in FIGS. 5, 6 and 7, hardfacing 20 may be placed on the exterior surface of support arms 134 adjacent to the respective cutter cone assemblies 122. This portion of support arms 134 may also be referred to as the "shirttail surface." Hardfacing 20 may also be formed on backface surface or gauge ring surface 126 of each cutter cone assembly 122. As shown in FIG. 7 the exterior surface of cutter cone assembly 122 may be completely covered with hardfacing 20 except for inserts 128.

Rotary cone drill bit 160 shown in FIG. 8 is similar to rotary cone drill bit 120 as shown in FIG. 5. The principal difference between rotary cone drill bit 160 and rotary cone drill bit 120 is the use of inserts 128 as part of cutter cone assemblies 122 as compared to milled teeth 164 provided by cutter cone assemblies 162.

Figure 9:
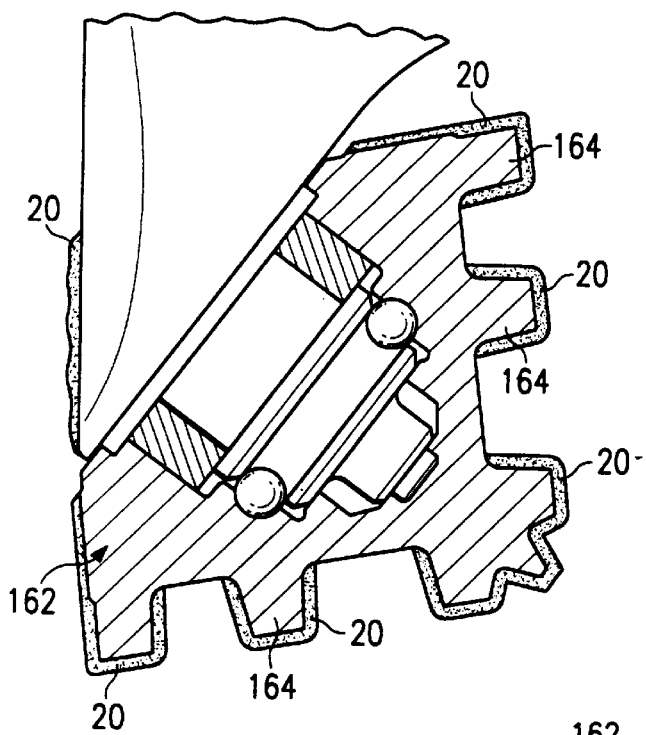
FIG. 9 is an enlarged, schematic drawing partially in section and partially in elevation with portions broken away showing a support arm and cutter cone assembly with is milled teeth having layers of hardfacing formed in accordance with teachings of the present invention.
Figure 10:
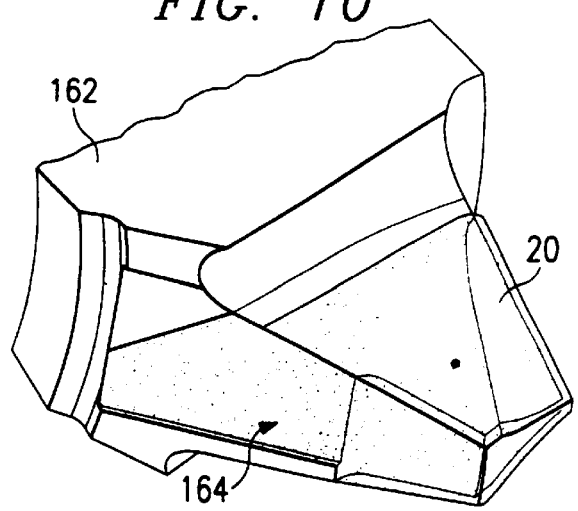
FIG. 10 is an isometric drawing with portions broken away showing a milled tooth covered with a layer of hardfacing incorporating teachings of the present invention.

Milled teeth 164 are formed on each cutter cone assembly 162 in rows along the tapered surface of each of the respective cone assemblies 162. The row closest to the support arm of each cutter cone assembly 162 is known as the back row, or gage row. As shown in FIGS. 9 and 10 matrix deposit 20 is preferably applied to the exterior of each milled tooth 164 in accordance with the teachings of the present invention.

Although the present invention has been described with several embodiments, various changes and modifications may be suggested to one skilled in the art. It is intended that the present invention encompass such changes and modifications as fall within the scope of the present appended claims.

What is claimed is:

1. A hardfacing to protect a substrate from abrasion and wear comprising:

a matrix deposit having a matrix portion with a plurality of coated cubic boron nitride particles disposed therein;

each coated cubic boron nitride particle having a coating of hard material disposed on the exterior of the respective cubic boron nitride particle, with a plurality of first metallurgical bonds formed between the exterior of the respective cubic boron nitride particle and the respective hard material coating;

the coated cubic boron nitride particles encapsulated in the matrix portion with a plurality of second metallurgical bonds formed between the respective hard material coating on each cubic boron nitride particle and the matrix portion; and a plurality of third metallurgical bonds formed between the matrix portion and the substrates wherein said coating has a thickness roughly equal to one half the diameter of the respective cubic boron nitride particle.

2. The hardfacing of claim 1 further comprising small grains of material selected from the group consisting of boride alloys, carbide alloys, oxide alloys and nitride alloys dispersed within the coating of hard material on each cubic boron nitride particle to further reinforce the coating.

3. The hardfacing of claim 1, wherein the matrix deposit comprises metal alloys and cermets selected from the group consisting of metal borides, metal carbides, metal oxides, and metal nitrides.

4. The hardfacing of claim 1, wherein the coating on each cubic boron nitride particle further comprises metal alloys and cermets selected from the group consisting of metal borides, metal carbides, metal oxides, and metal nitrides.

5. The hardfacing of claim 1, further comprising:

a plurality of tungsten carbide particles encapsulated in the matrix portion; and the tungsten carbide particles intermixed with the coated cubic boron nitride particles.

6. The hardfacing of claim 1, wherein, prior to coating, each cubic boron nitride particle has substantially the same size.

7. The hardfacing of claim 1, wherein the cubic boron nitride particles have at least two different sizes prior to coating.

8. The hardfacing of claim 1, wherein each coated cubic boron nitride particle has approximately the same density as the matrix portion.

9. The hardfacing of claim 1, wherein the coated cubic boron nitride particles have a density greater than the density of the matrix portion.

10. The hardfacing of claim 1, further comprising:

additional material intermixed with the plurality of coated cubic boron nitride particles; and the additional material selected from the group consisting of carbides, nitrides, borides, silicides, and oxides of tungsten, niobium, vanadium, molybdenum, titanium, tantalum, hafnium yttrium, zirconium, chromium, boron, carbon and mixtures thereof.

11. The hardfacing of claim 1, wherein the matrix portion comprises binder material selected from the group consisting of copper, nickel, iron, and cobalt based alloys.

12. The hardfacing of claim 1, further comprising:

a coating on each cubic boron nitride formed in part from tungsten carbide;

a plurality of tungsten carbide particles mixed with the coated cubic boron nitride particles; and the matrix portion formed from alloys of cobalt, steel, and tungsten carbide.

13. The hardfacing of claim 1, wherein the matrix deposit and the plurality of coated cubic boron nitride particles are disposed on a substrate selected from the group consisting of a rotary cone drill bit, a fixed cutter drill bit, a sleeve for a drill bit, a coring bit, an under reamer, a hole opener, a downhole stabilizer or a shock absorber assembly.

14. A hardfacing to protect a substrate from abrasion, erosion and wear comprising:

a plurality of coated hard particles with each hard particle having a coating of hard material disposed on the exterior of the respective hard particle with a plurality of first metallurgical bonds formed between the exterior of each hard particle and the respective hard material coating;

a matrix portion with the coated hard particles encapsulated in the matrix portion by mechanical bonds and a plurality of second metallurgical bonds formed between the exterior of the respective hard material coating on each hard particle and the matrix portion;

the matrix portion bonded with the substrate by a plurality of third metallurgical bonds; and the hard particles selected from the group consisting of cubic boron nitride, silicon nitride, silicon carbide and boron carbide;

wherein said coating has a thickness roughly equal to one half the diameter of the respective hard particle.

15. A rotary cone drill bit having at least one row of milled teeth with each tooth comprising:
- a tip, a base, two opposing side surfaces extending between the tip and the base;
- a front surface intermediate the side surfaces and extending between tip and the base;
- a back surface intermediate the side surfaces and opposite the front surface;
- a layer of hardfacing applied on each surface of each tooth;
- the hardfacing having a plurality of coated cubic boron nitride particles dispersed within and bonded to a matrix portion;
- each coated cubic boron nitride particle having a coating of hard material disposed on the exterior of the respective cubic boron nitride particle, with a plurality of first metallurgical bonds formed between the exterior of each cubic boron nitride particle and the respective hard material coating;
- the coated cubic boron nitride particles encapsulated in the matrix portion with a plurality of second metallurgical bonds formed between the respective hard material coating on each cubic boron nitride particle and the matrix portion; and
- a plurality of third metallurgical bonds formed between the matrix portion and each surface of each tooth;
- wherein said coating has a thickness roughly equal to one half the diameter of the respective cubic boron nitride particle.

16. The rotary cone drill bit of claim 15 further comprising tungsten carbide particles mixed with the coated cubic boron nitride particles.

17. The rotary cone drill bit of claim 15, wherein the density of each coated cubic boron nitride particle approximately equals the density of the matrix portion.

18. The rotary cone drill bit of claim 15, wherein the density of each coated cubic boron nitride particle is generally greater than the density of the matrix portion.

19. The rotary cone drill bit of claim 15, wherein the layer of hardfacing material comprising by weight percent approximately one percent to seventy-five percent coated cubic boron nitride particles.

20. A rotary cone drill bit for forming a borehole, the drill bit comprising:
- a bit body with an upper end portion adapted for connection to a drill string for rotation about a longitudinal axis of the bit body;
- a number of angularly-spaced support arms integrally formed with the bit body and depending therefrom, each of the support arms having an inside surface with a spindle connected thereto and an outer shirttail surface;
- each spindle projecting generally downwardly and inwardly with respect to the longitudinal axis of the bit body and having a generally cylindrical upper end portion connected to the inside surface of the respective support arm;
- a number of cutter cones equaling the number of support arms and each cutter cone respectively mounted on one of the respective spindles;
- a layer of hardfacing formed on a portion of each shirttail surface;
- the layer of hardfacing having a plurality of coated hard particles dispersed within and metallurgically bonded to a matrix deposit; and
- the coated hard particles comprising a hard particle selected from the group consisting of silicon nitride, silicon carbide, boron carbide and cubic boron nitride;
- wherein said coated hard particles have a coating which has a thickness equal to roughly one-half the diameter of the respective hard particle.

21. A rotary cone cutter for boring engagement with a side wall and bottom of a borehole comprising:
- a generally conical metal body having a central axis, a tip having a plurality of inserts protruding therefrom and a base connected to the tip to form the body;
- a cavity formed in the body along the axis and opening from the base into the tip;
- an annular backface formed on an outer portion of the base;
- the backface having a layer of hardfacing with a plurality of coated hard particles dispersed within and metallurgically bonded to a matrix deposit for boring engagement with the side wall of the borehole; and
- the coated hard particles comprising a hard particle selected from the group consisting of silicon nitride, silicon carbide, boron carbide and cubic boron nitride;
- wherein said coated hard particles have a coating which has a thickness equal to roughly one-half the diameter of the respective hard particle.

22. In a rotary rock bit for forming a borehole, the improvement comprising:
- a generally conical cutter body with an opening at one end of the body and a cavity extending into the body from the opening for use in mounting the cutter body on the rock bit;
- a tip pointed away from the cavity opening;
- a base connected to the tip to partially define the cavity opening;
- the base having a backface surrounding said cavity opening, the backface having a generally frustoconical shape directed away from the tip;
- a layer of hardfacing disposed on an outer portion of the base and extending over the exterior of the tip;
- the layer of hardfacing having a plurality of coated cubic boron nitride particles disposed within and metallurgically bonded to a matrix deposit;
- each coated cubic boron nitride particle having a coating of hard material disposed on the exterior of the cubic boron nitride particle;
- a plurality of metallurgical bonds formed between the exterior surface of each cubic boron nitride particle and the respective hard material coating; and
- a plurality of metallurgical bonds formed between the matrix deposit and the surface of the outer base portion and the exterior of the tip;
- wherein said coated hard particles have a coating which has a thickness equal to roughly one-half the diameter of the respective hard particle.

* * * * *